US009512324B2

(12) United States Patent
Hunt et al.

(10) Patent No.: US 9,512,324 B2
(45) Date of Patent: Dec. 6, 2016

(54) ANTIBACTERIAL METALLIC NANOFOAM AND RELATED METHODS

(71) Applicants: The Texas A&M University System, College Station, TX (US); Texas Tech University System, Lubbock, TX (US)

(72) Inventors: Emily M. Hunt, Canyon, TX (US); Michelle L. Pantoya, Lubbock, TX (US)

(73) Assignees: The Texas A&M University System, College Station, TX (US); Texas Tech University, Lubbock, TX (US)

( * ) Notice: Subject to any disclaimer, the term of this patent is extended or adjusted under 35 U.S.C. 154(b) by 806 days.

(21) Appl. No.: 13/645,318

(22) Filed: Oct. 4, 2012

(65) Prior Publication Data

US 2013/0087069 A1 Apr. 11, 2013

Related U.S. Application Data

(60) Provisional application No. 61/543,679, filed on Oct. 5, 2011.

(51) Int. Cl.
| | | |
|---|---|---|
| *C22C 1/05* | (2006.01) | |
| *C22C 1/10* | (2006.01) | |
| *A61L 2/238* | (2006.01) | |
| *C09D 7/12* | (2006.01) | |
| *C09D 5/14* | (2006.01) | |
| *C22C 1/08* | (2006.01) | |
| *C22C 21/00* | (2006.01) | |
| *B22F 1/00* | (2006.01) | |
| *B22F 3/11* | (2006.01) | |
| *C22C 29/12* | (2006.01) | |
| *C22C 32/00* | (2006.01) | |
| *B82Y 30/00* | (2011.01) | |
| *B22F 1/02* | (2006.01) | |

(52) U.S. Cl.
CPC ........... *C09D 7/1291* (2013.01); *B22F 1/0018* (2013.01); *B22F 3/1143* (2013.01); *B82Y 30/00* (2013.01); *C09D 5/14* (2013.01); *C09D 7/1225* (2013.01); *C22C 1/051* (2013.01); *C22C 1/08* (2013.01); *C22C 1/10* (2013.01); *C22C 21/00* (2013.01); *C22C 29/12* (2013.01); *C22C 32/0015* (2013.01); *C22C 32/0036* (2013.01); *B22F 1/0048* (2013.01); *B22F 1/02* (2013.01); *Y10T 428/24997* (2015.04)

(58) Field of Classification Search
None
See application file for complete search history.

(56) References Cited

U.S. PATENT DOCUMENTS

| | | | |
|---|---|---|---|
| 8,404,280 B2 | 3/2013 | Muthusamy | |
| 9,162,013 B2 | 10/2015 | Guggenbichler et al. | |
| 2007/0000407 A1 | 1/2007 | Leong | |
| 2007/0142643 A1 | 6/2007 | Huynh | |
| 2007/0292699 A1 | 12/2007 | Watson | |
| 2010/0080949 A1 | 4/2010 | Ou | |
| 2011/0045204 A1 | 2/2011 | Robertson | |
| 2012/0189534 A1* | 7/2012 | Hussain | B82Y 30/00 423/604 |

FOREIGN PATENT DOCUMENTS

| | | |
|---|---|---|
| CN | 1303599 A | 7/2001 |
| CN | 1478817 A | 3/2004 |
| CN | 1799523 A | 7/2006 |
| CN | 101078067 A | 11/2007 |
| CN | 101610679 A | 12/2009 |
| JP | 2003-212707 A | 7/2003 |
| JP | 2006-069935 A | 3/2006 |
| JP | 2007042301 A * | 3/2007 |
| JP | 2011-523677 A | 8/2011 |
| WO | 2009/103956 A1 | 8/2009 |
| WO | WO-2011/058227 A1 * | 5/2011 |

OTHER PUBLICATIONS

International Search Report and Written Opinion mailed Mar. 25, 2013, issued in corresponding International Application No. PCT/US2012/058777, filed Oct. 4, 2012, 12 pages.
Australian Patent Examination Report No. 1, mailed Aug. 31, 2015, issued in corresponding Australian Application No. 2012318564, filed Oct. 4, 2012, 2 pages.
Farley, C., et al., "Self-Propagating High-Temperature Synthesis of Nanostructured Titanium Aluminide Alloys With Varying Porosity," Acta Materialia 59(6):2447-2454, Apr. 2011.
Granier, J.J., and M.L. Pantoya, "Laser Ignition of Nanocomposite Thermites," Combustion and Flame 138(4):373-83, Sep. 2004.
Hunt, E.M., et al., "Nano-Scale Reactants in the Self-Propagating High-Temperature Synthesis of Nickel Aluminide," Acta Materialia 52(11):3183-3191, Jun. 2004.
Notice of the First Office Action, mailed May 28, 2015, issued in corresponding Chinese Application No. 201280059692.6, filed Oct. 4, 2012, 27 pages.
Notice on the Second Office Action mailed Apr. 12, 2016, issued in corresponding Chinese Application No. 201280059692.6, filed Oct. 4, 2012, 25 pages.
First Office Action mailed Jul. 12, 2016, issued in corresponding Japanese Application No. 2014-534727, filed Oct. 25, 2012, 11 pages.
Hunt, E.M., et al., "Combustion Synthesis of Metallic Foams From Nanocomposite Reactants," Intermetallics 14(6):620-629, Jun. 2006.

(Continued)

*Primary Examiner* — George Wyszomierski
(74) *Attorney, Agent, or Firm* — Christensen O'Connor Johnson Kindness PLLC

(57) ABSTRACT

Antibacterial metallic nanofoams, substrates having the nanofoam coated thereon, methods for preventing, inhibiting, and/or killing bacterial growth using the metallic nanofoams, and compositions and methods for making the metallic nanofoams.

27 Claims, 10 Drawing Sheets

(56) References Cited

OTHER PUBLICATIONS

Notice of Third Office Action, mailed Aug. 8, 2016, issued in corresponding Chinese Application No. 201280059692.6, filed Oct. 4, 2012, 30 pages.
Zhang, X., et al., "Combustion Synthesis of Porous Materials for Bone Replacement," Biomedical Sciences Instrumentation 37:463-468, Dec. 2001.

* cited by examiner

US 9,512,324 B2

ANTIBACTERIAL METALLIC NANOFOAM AND RELATED METHODS

CROSS-REFERENCE TO RELATED APPLICATION

This application claims the benefit of U.S. Patent Application No. 61/543,679, filed Oct. 5, 2011, expressly incorporated herein by reference in its entirety.

STATEMENT OF GOVERNMENT LICENSE RIGHTS

This invention was made with Government support under Grant No. CBET-0914382 awarded by the National Science Foundation and Grant No. HDTRA-1-08-10-BRCWMD awarded by the Defense Threat Reduction Agency. The Government has certain rights in the invention.

BACKGROUND OF THE INVENTION

Bacterial contamination in hospitals, food industries, oil industries, and public environments create a major public health issue. Despite considerable research and development efforts, the problem of contaminations related to biomedical devices, pipeline applications and food preparation persists. Traditional cleaning methods, such as aerosolized disinfectant sprays or wipes, have a limited effectiveness. There is a need to mitigate bacterial colonization by engendering materials with properties that include surface chemistry and surface roughness that are unfavorable for bacterial attachment and growth.

The present invention seeks to fulfill this need and provides further related advantages.

SUMMARY OF THE INVENTION

In one aspect, the invention provides a metallic nanofoam. In one embodiment, the metallic nanofoam comprises a metal or metal alloy, and an antibacterial metal ion, wherein the material comprises a plurality of pores having an average pore size of less than one micrometer. Representative metals include aluminum, titanium, manganese, molybdenum, and gold, or a combination thereof. Representative metal alloys include a metal selected from aluminum, titanium, manganese, molybdenum, and gold. Representative antibacterial metal ions include silver, copper, iron, tin, lead, zinc, nickel, cadmium, chromium, cobalt, bismuth, mercury, gold, and aluminum ions, and combinations thereof. The nanofoam has a stoichiometric equivalence ratio of metal or metal alloy to antibacterial metal ion from about from 0.8 to about 1.2.

In another aspect of the invention, a coated substrate is provided. In one embodiment, the substrate has a surface that is at least partially covered with a coating comprising a nanofoam of the invention. Representative substrates include substrates that come into contact with the human body (e.g., medical devices) and substrates that come into contact with food.

In a further aspect, the invention provides a method of preventing, inhibiting, and/or killing bacterial growth on or in a substance. In one embodiment, the method includes contacting the substance with a nanofoam of the invention. Bacteria that are advantageously treated by the method include spore-forming bacteria.

In another aspect of the invention, a method of making a metallic nanofoam is provided. In one embodiment, the method includes:

(a) combining metal or metal alloy nanoparticles with metal oxide particles to provide a reactant mixture, wherein the metal of the metal oxide is antibacterial, wherein the average maximum dimension of the metal oxide particles is less than one micrometer, and wherein the stoichiometric equivalence ratio of the metal nanoparticles to the metal oxide particles is from about 0.8 to about 1.2;

(b) drying the reactant mixture, as necessary, to provide a dried mixture;

(c) optionally pressing the dried mixture to provide the mixture in pellet form; and (d) subjecting the mixture to combustion synthesis to provide a metallic nanofoam. In one embodiment, the stoichiometric equivalence ratio of the metal nanoparticles to the metal oxide particles is about 1.0. In one embodiment, the combustion synthesis is self-propagating high-temperature combustion synthesis. In another embodiment, the combustion synthesis is volumetric combustion synthesis. In one embodiment, the method further includes the use of a gasifying agent. Metallic nanofoams prepared by the method of the invention are also provided.

In a further aspect, the invention provides a composition for making a metallic nanofoam. In one embodiment, the composition is a powder comprising metal or metal alloy nanoparticles and metal oxide particles, wherein the metal of the metal oxide is antibacterial, and wherein the average maximum dimension of the metal oxide particles is less than one micrometer.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

FIG. 2A, nano Al+Ag$_2$O at 24 hours; FIG. 2B, nano Al+Ag$_2$O at 48 hours; FIG. 2C, nano Al+TiO$_2$ at 24 hours; FIG. 2D, nano Al+TiO$_2$ at 48 hours.

FIG. 2E, nano Al+Ni at 24 hours; FIG. 2F, nano Al+Ni at 48 hours.

FIG. 4A: control plate with *Bacillus megaterium* at 24 hours after application, *B. megaterium* covers the entire plate. FIG. 4B: control plate with *B.*

*megaterium* at 48 hours after application, *B. megaterium* covers the entire plate. FIG. 4C: silver oxide and aluminum (Ag$_2$O+Al) nanofoam plate with *B. megaterium* swabbed onto the surface of the agar at 24 hours after application, *B. megaterium* growing near the top of the plate in two isolated areas and not growing on or around the dark metal nanofoam in the center of the plate. FIG. 4D: silver oxide and aluminum (Ag$_2$O+Al) nanofoam plate with *B. megaterium* swabbed onto the surface of the agar at 48 hours after application, *B. megaterium* growing at the top right of the plate as well as an isolated growth near the left edge of the plate. While there has been additional growth, no growth closer to the dark metal nanofoam in the center of the plate. FIG. 4E: silver oxide and aluminum (Ag$_2$O+Al) nanofoam plate with a mixture of agar and *B. megaterium* poured onto agar (agar overlay) at 24 hours after application. Small white circles at the bottom left as well as directly to the right of the metal nanofoam are bacterial growth. FIG. 4F: nano silver oxide and aluminum (Ag$_2$O+Al) plate (agar overlay) at 48 hours after application. The *B. megaterium* has grown over most of the bottom left side and right side of the plate with additional growth appearing to left of and above the metal nanofoam. While there is considerable growth, it is clear that there is a barrier of bacterial growth at the edges of the metal nanofoam. FIG. 4G: nano titanium dioxide and aluminum (TiO$_2$+Al) plate (agar overlay) at 24 hours after application. The *B. megaterium* is covering the entire plate making it difficult to see the darker colored metal nanofoam in the center. FIG. 4H: nano titanium dioxide and aluminum (TiO$_2$+Al) plate (agar overlay) at 48 hours after application. The *B. megaterium* is growing over the entire plate.

DETAILED DESCRIPTION OF THE INVENTION

Figure 1:
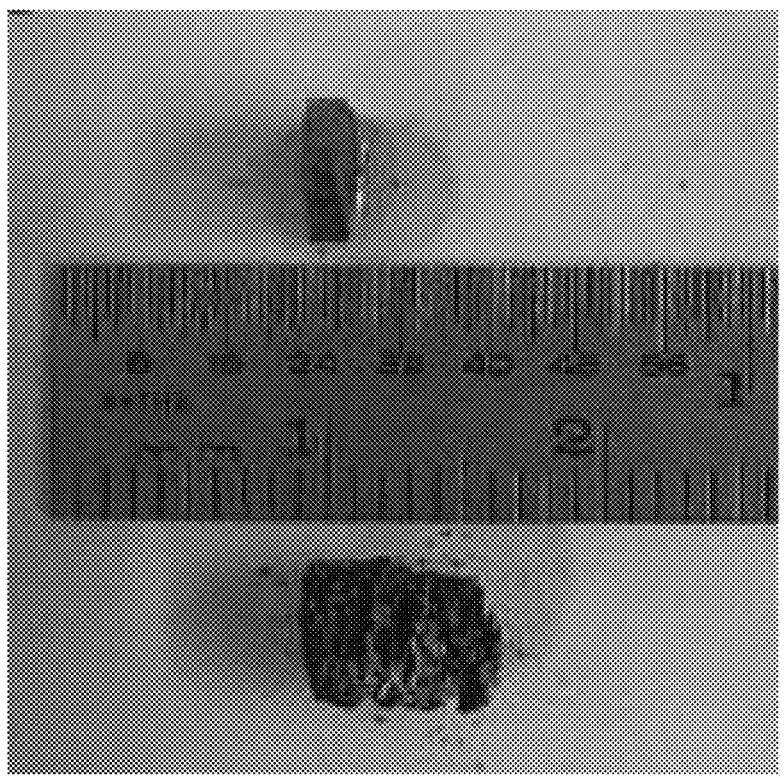
FIG. 1 is a photograph comparing an aluminum-based metallic composition prior to combustion synthesis and a representative metallic nanofoam of the invention prepared from the composition via combustion synthesis. The photograph illustrates the expansion in volume resulting from combustion synthesis of the composition (1 mm width) to provide the metallic nanofoam (7 mm width).

The present invention provides antibacterial metallic nanofoams, substrates having the nanofoam coated thereon, methods for preventing and inhibiting bacterial growth using the metallic nanofoams, and compositions and methods for making the metallic nanofoams.

In one aspect of the invention, antibacterial metallic nanofoams are provided. The nanofoams are porous metallic materials. The nanofoams include an antibacterial metal ion and a metal or metal alloy. The nanofoam is a porous material having a plurality of pores, where the average pore size (e.g., diameter) is less than one micrometer (<1 μm). As used herein, the term "metal" refers to a zero valent metal, the term "metal alloy" refers to a mixture of two (or more) zero valent metals. The nanofoam's metal ion imparts antibacterial properties to the nanofoam.

The nanofoams of the invention are porous materials in which the pore size (e.g., diameter), pore size distribution, and porosity can be tailored to meet the needs of the specific antibacterial application. These properties can be varied by the combustion synthesis conditions used to prepared the nanofoams. As noted above, the nanofoam has an average pores size (e.g., pore diameter) that is less than one micrometer. In certain embodiments, the average pore size is from about 0.05 to 0.95 μm. In other embodiments, the average pore size is from about 0.1 to 0.9 μm. In further embodiments, the average pore size is from about 0.25 to 0.75 μm. In certain embodiments, the nanofoam has a porosity from about 30 to about 70%. In other embodiments, the porosity is from about 40 to 60%.

The nanofoam is a metallic material that includes one or more metals. Suitable metals include those suitable for combustion synthesis. Representative metals include aluminum, titanium, manganese, molybdenum, and gold. The nanofoam can also include combinations of metals.

In addition to a metal, the nanofoam can also include a metal alloy. Suitable metal alloys include those suitable for combustion synthesis. Representative metal alloys include metals such as aluminum, titanium, manganese, molybdenum, and gold. The nanofoam can also include combinations of metal alloys. The nanofoam's metal alloy can be formed during the combustion synthesis process for preparing the nanofoam from a combination of suitable metals.

The nanofoam of the invention has antibacterial properties imparted by the nanofoam's metal ion. Suitable metal ions include any metal ion having antibacterial properties and that is suitable for combustion synthesis. Representative metal ions include silver, copper, iron, tin, lead, zinc, nickel, cadmium, chromium, cobalt, bismuth, mercury, gold, and aluminum ions. The nanofoam can also include combinations of metal ions.

The ratio of metal or metal alloy to metal ion in the nanofoam is controlled by the ratio of metal (or metal alloy) to metal oxide used in the combustion synthesis process for making the nanofoam. In certain embodiments, the stoichiometric equivalence ratio of metal or metal alloy to metal ion is from about 0.8 to about 1.2. In one embodiment, the ratio is from about 0.9 to about 1.1. In another embodiment, the ratio is about 1.0. In a further embodiment, the ratio is from about 1.05 to about 1.2. In a further embodiment, the ratio is from about 0.8 to about 0.95.

The nanofoam of the invention can be used to impart antibacterial properties to substrates by associating the nanofoam with the substrate. Thus, in another aspect, the invention provides a substrate having a coating that includes the nanofoam of the invention. The coating can cover all or part of a surface of the substrate. The substrate can have one or more surfaces that can be covered with the coating.

Suitable substrate surfaces include any surface that can benefit from a coating that includes a nanofoam of the invention. Representative substrates include substrates that come into contact with the human body. Representative devices include medical devices, such as catheters, guide wires, balloons, filters, stents, and implantable devices. Other representative devices include surgical instruments and operating surfaces and tables. Representative devices also include surfaces that come into contact with food, such as food processing and packaging equipment, as well as consumer products such as food preparation surfaces, countertops, cutting boards, and serving surfaces.

The substrate (the material to be coated) will be covered with a layer of the reactant nanopowder. Once combustion synthesis (e.g., SHS or VCS) is initiated with an outside source (e.g., laser, thermal spray gun, torch), the material undergoes combustion synthesis and the new metallic nanofoam is coated onto the substrate.

In a further aspect of the invention, methods for preventing, inhibiting, and/or killing bacterial growth are provided. In one embodiment, the invention provides a method of inhibiting bacterial growth on or in a substance, comprising contacting the substance with a nanofoam of the invention. The substance can be a solid or a liquid. Alternatively, the nanofoam can be a coating on all or part of a substrate surface. Representative substrate surfaces are described above. The methods are useful for preventing, inhibiting, and/or killing bacterial growths that include a variety of bacteria including spore-forming bacteria. Bacteria that are effectively treated in the method include *Bacillus subtilis*,

*Bacillus anthracis, Bacillus thuringiensis* and other common bacteria such as *E. coli, Salmonella,* and *Bacillus megaterium*.

As used herein, "inhibiting" or any variation thereof, includes any measurable decrease or complete inhibition to achieve a desired result. Prevention as well as slowing of growth is encompassed by this term. For example, there may be a decrease of about, at least about, or at most about 5%, 10%, 15%, 20%, 25%, 30%, 35%, 40%, 45%, 50%, 55%, 60%, 65%, 70%, 75%, 80%, 85%, 90%, 95%, 99%, or more, such as 100%, or any range derivable therein, in activity compared to normal. In some embodiments, bacterial growth is inhibited such that growth is reduced in the presence of a porous antibacterial material described herein as compared to bacterial growth in the absence of such a material.

The antibacterial effectiveness of representative metallic nanofoams of the invention is described in Example 2 and illustrated in FIGS. 2 and 4.

In another aspect, the invention provides a composition useful for making the metallic nanofoam. In one embodiment, the composition for making the nanofoam is a powder that includes metal or metal alloy particles (i.e., a plurality of first particles) and metal oxide particles (i.e., a plurality of second particles).

In certain embodiments, the metal or metal alloy particles are nanoparticles having at least one dimension less than 100 nm. In some embodiments, a particle is about, at most about, or at least about 0.1, 0.5, 1, 5, 10, 20, 30, 40, 50, 60, 70, 80, 90, or 99 nm at its maximum dimension, or any range derivable therein. The nanoparticle may be spherical or other shape, such as cylindrical or rod-shaped. Spherical shapes and substantially spherical shapes typically yield the best results in terms of nanofoam formation. Metallic nanoparticles are commercially available.

In the composition, the metal of the metal oxide is antibacterial and the average maximum dimension of the particles is less than one micrometer (<1 µm). In some embodiments, the average pore size ranges from about, at least about, or a most about 0.1, 0.5, 1, 5, 10, 20, 30, 40, 50, 60, 70, 80, 90, 100, 250, 500, 750, 900, 950, or 999 nm, or more, or any range derivable therein, but less than one micrometer.

In certain embodiments, the metal oxide particle is a submicron particle (average maximum dimension less than one micron, e.g., from about 0.05 to about 095 µm, from 0.1 to about 0.9 µm, from 0.25 to about 0.75 µm, or about 0.5 µm). Metal oxide particles described herein may also be spherical or other shape, such as cylindrical or rod-shaped. Spherical shapes and substantially spherical shapes typically yield the best results in terms of producing nanofoams with antibacterial effectiveness.

The powder can be in the form of a loose powder or a pressed powder. In certain embodiments, the powder is pressed to about 70% of theoretical maximum. In some embodiments, the powder may be pressed to about, at most about, or at least about 60%, 65%, 70%, 75%, or 80%, or more, or any range derivable therein.

Suitable metal particles include a metal selected from aluminum, titanium, manganese, molybdenum, gold, and combinations thereof. Suitable metal alloy particles include a metal selected from aluminum, titanium, manganese, molybdenum, and gold. Suitable metal oxides include a metal selected from silver, copper, iron, tin, lead, zinc, nickel, cadmium, chromium, cobalt, bismuth, mercury, gold, and aluminum ions, and combinations thereof. In one embodiment, the metal oxide is silver oxide ($Ag_2O$). In another embodiment, the metal oxide is titanium oxide ($TiO_2$).

In another aspect, the invention provides a method for making a metallic nanofoam. In one embodiment, the method includes:

(a) combining a metal and/or metal alloy particles with metal oxide particles to provide a reactant mixture, wherein the metal of the metal oxide is antibacterial, and wherein the average maximum dimension of the metal oxide particles is less than one micrometer, and wherein the stoichiometric equivalence ratio of the metal and/or metal alloy particles to the metal oxide particles is from about 0.8 to about 1.2;

(b) drying the reactant mixture, as necessary, to provide a dried mixture;

(c) optionally pressing the dried mixture to provide the dried mixture in the form pellet; and (d) subjecting the dried mixture to combustion synthesis to provide a metallic nanofoam.

The optional pressing step allows for tailoring the properties of the product nanofoam (e.g., porosity, density, pore size).

In the above method, the stoichiometric equivalence ratio of the metal and/or metal alloy particles to the metal oxide particles is in the range from about 0.8 to about 1.2. In one embodiment, the ratio is from about 0.9 to about 1.1. In another embodiment, the ratio is about 1.0. In a further embodiment, the ratio is from about 1.05 to about 1.2. In a further embodiment, the ratio is from about 0.8 to about 0.95.

In one embodiment of the above method, the metal oxide is the gasifying agent in the combustion synthesis. In one embodiment, no other gasifying agent is used in the method and the metal oxide is the sole gasifying agent. In another embodiment, the method further includes the use a gasifying agent other than the metal oxide. Gasifying agents other than the metal oxide are known in the art. It will be appreciated that when the method includes a gasifying agent other than the metal oxide, the stoichiometric equivalence ratio of the metal and/or metal alloy particles to the metal oxide particles can be varied outside of the range from about 0.8 to about 1.2.

In the method, the metal of the metal oxide is antibacterial and the average maximum dimension of the particles is less than one micrometer (<1 µm). In certain embodiments, the metal or metal alloy particles are nanoparticles having at least on dimension less than 100 nm. In certain embodiments, the metal oxide particle is a submicron particle (average maximum dimension less than one micron, e.g., from about 0.05 to about 095 µm, from 0.1 to about 0.9 µm, from 0.25 to about 0.75 µm, or about 0.5 µm). Suitable metal particles include a metal selected from aluminum, titanium, manganese, molybdenum, gold, and combinations thereof. Suitable metal alloy particles include a metal selected from aluminum, titanium, manganese, molybdenum, and gold. Suitable metal oxides include a metal selected from silver, copper, iron, tin, lead, zinc, nickel, cadmium, chromium, cobalt, bismuth, mercury, gold, and aluminum ions, and combinations thereof. In one embodiment, the metal oxide is silver oxide ($Ag_2O$). In another embodiment, the metal oxide is titanium oxide ($TiO_2$).

The nanofoams of the invention can be prepared by combustion synthesis. Combustion synthesis is described in *Intermetallics* 14:620 (2006). In general, a porous metallic foam may be created when a mildly energetic composite includes a modest amount of gasifying agent (GA). After reactants are homogeneously mixed and pressed into a pellet (typically cylindrical), reactants are combusted. Combustion may be initiated on the sample surface by a chemical, electrical, mechanical, or a radiant energy source (e.g., laser ignition). During reaction, the GA generates nucleation sites that promote the formation of bubbles. As the reaction wave passes, gas pockets within the bubbles escape, leaving a porous structure. Such methods are self-sustaining when the adiabatic flame temperature for the reaction is greater than or equal to about 2000 K. In previous combustion synthesis studies (e.g., *Nature* 127:741 (1931); *Nature Mater.* 2:386 (2003)), a GA may be added as a separate reactant, usually in the form of a powder or granular material. In embodiments of the method of the invention, metal oxide particles act as the GA in each mixture such that a separate GA is not needed; as such, some embodiments specifically exclude a GA other than the metal oxide particle. However, GA may be optionally added, such as to increase porosity. In addition, most previous work pertaining to the synthesis of porous materials using combustion synthesis is limited to micron-scale reactant particles. Herein, metallic nanoparticles and metal oxide particles having an average maximum dimension of less than one micrometer are employed, which provide nanofoams with high surface areas and antibacterial properties.

During volumetric combustion synthesis (VCS) or thermal explosion (TE), the entire sample is heated uniformly until the reaction occurs simultaneously throughout the sample volume. This reaction results in the formation of a product with the desired microstructure and properties. As used herein, the term "explosion" in thermal explosion refers to the rapid increase in temperature after the initiation of the reaction.

In embodiments employing mixing of metal nanoparticles and metal oxide particles, mixing refers to mechanical mixing, such as sonication.

In one embodiment, the combustion synthesis is self-propagating high-temperature combustion synthesis. In another embodiment, the combustion synthesis is volumetric combustion synthesis.

The preparation and properties of representative metallic nanofoams of the invention are described in Example 1.

In a further aspect, the invention provides a metallic nanofoam prepared by the methods of the invention.

The present invention provides highly porous, antibacterial solid materials, metallic nanofoams by combustion synthesis. In certain embodiments, that metallic foams include pores having nanometer dimensions and that exhibit antibacterial properties. The nanofoams have a high surface area and are resistant to spore-forming bacterial growth. These materials may be used, for example, as a surface coating anywhere where bacterial growth is not wanted, such as medical devices or other medical surfaces, commercial kitchens, and military applications. The metallic nanofoams present a novel approach to bacterial neutralization.

It will be appreciated that, in certain embodiments, the metallic nanofoam of the invention comprises the specified components; in other embodiments, the metallic nanofoam consists essentially of the specified components; and in further embodiments, the metallic nanofoam consists of the specified components. The term "comprises" or "comprising" defines the nanofoam as including the specified components and does not preclude the option of the nanofoam including other non-specified components. The term "consists essentially of" or "consisting essentially of" defines the metallic nanofoam as including the specified components as well as other non-specified components that do not materially affect the basic and novel characteristic(s) of the nanofoam. For example, a component that does not materially affect the basic and novel characteristics of such an embodiment includes impurities and other components that do not weaken the structural component, or compromise the antibacterial activity of the nanofoam. Methods of assessing antibacterial activity are known in the art, and some methods are described herein. The term "consists of" or "consisting of" defines the metallic nanofoam as including only the specified components and no others.

As used herein, the term "about" is used to indicate that a value includes the standard deviation of error for the device or method being employed to determine the value (e.g., ±5%). In any embodiment discussed in the context of a numerical value used in conjunction with the term "about," it is specifically contemplated that the term about can be omitted.

The following examples are provided for the purpose of illustrating, not limiting the invention.

EXAMPLES

Example 1

Self-Propagating High-Temperature Synthesis and Antibacterial Properties of Representative Nanofoams Al/Ag$_2$O and Al/TiO$_2$ Experiments were performed to demonstrate bacterial growth kinetics on synthesized foams. The bacteria used for this study was *Bacillus subtilis*, a spore-forming bacterium like anthrax, but benign. Experimental results were obtained for mixtures composed of Al/Ag$_2$O and Al/TiO$_2$ using nanoscale aluminum. Experiments were also conducted on micron-scale Al/Ag$_2$O to examine the effect of the particle size.

Particles were mixed by sonication in the same method as described in *Intermetallics* 14:620 (2006). However, in contrast to that work, the metal oxide nanoparticles acted as the gasification agent (GA) in each mixture. Aluminum particles (nmAl) (NovaCentrix, Inc) with an average particle diameter of 50 nm were passivated with an average alumina shell 2 nm thick and were spherical in shape. The 10 micrometer Al (micron Al) particles had an estimated 3 nm thick oxide shell and were also spherical. All other metal oxide particles also exhibited spherical morphology. Ag$_2$O was purchased from Sigma-Aldrich in two different sizes and had an average particle diameter of 30 microns and 100 nm. Particle size, Al shell thickness and morphology information were provided by the suppliers. Each mixture was prepared for a stoichiometric equivalence ratio of 1.0. Each sample contained 100 mg of reactant mixture cold pressed to a theoretical maximum density of 70%.

Self-propagating high-temperature synthesis (SHS) was used to create the metallic foams and the experimental set-up and method as described in *Intermetallics* 14:620 (2006). Briefly, reactant particles were suspended in a solvent of hexanes and mixed using sonication. The final powder was dried and cold-pressed in a uniaxial die to create cylindrical pellets with a diameter of about 6.5 mm and an initial length of 1 mm. The theoretical maximum density was calculated for each mixture as a weighted average of the pure solid densities of the constituent reactants, and each sample was pressed to a density of 70% of the theoretical value. Pellets were ignited with a 50 W CO$_2$ laser (Universal Laser Systems Inc., Scottsdale, Ariz.). A power meter and associated optics were used to monitor the laser power and align the laser beam with the front face of the pellet, respectively.

FIG. 1 shows the expansion of the pressed reactant mixture into a metallic foam following SHS, where the product expanded from 1 to 7 mm during combustion. An increase in the gas pressure in the pores of the sample caused enlargement and the entire volume of the sample to increase. The elongation is dependent on the gas pressure in the pores of the sample which can be controlled by varying the amount of GA in the reactant mixture.

Figure 2A:
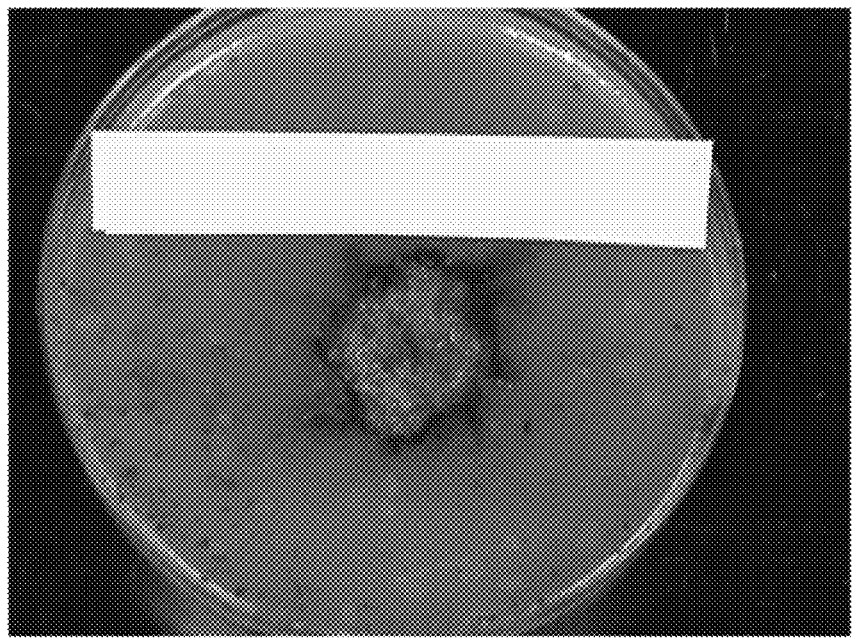
FIGS. 2A-2D are photographs comparing bacterial growth (*Bacillis subtilis*) on agar plates in the presence of representative aluminum-based metallic nanofoams of the invention.
Figure 2B:
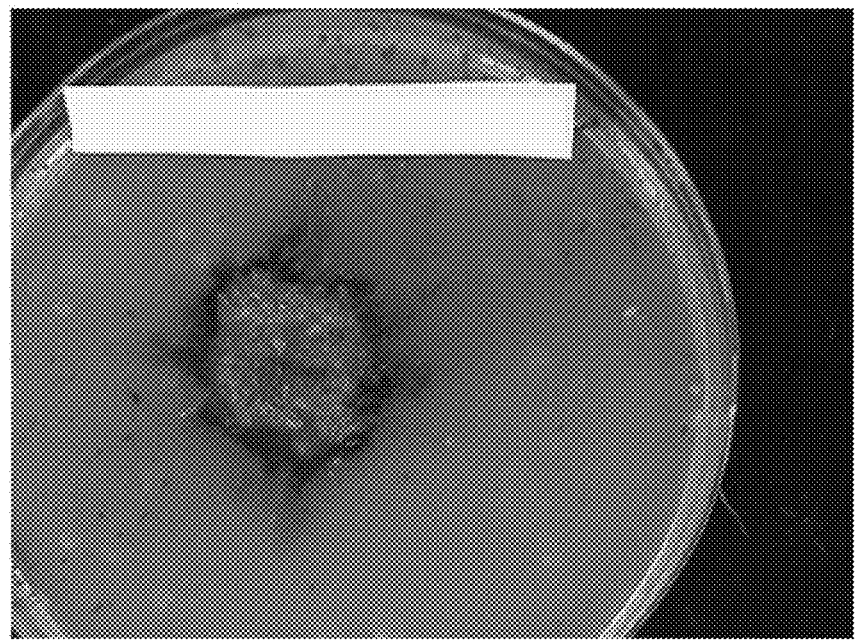
Figure 2C:
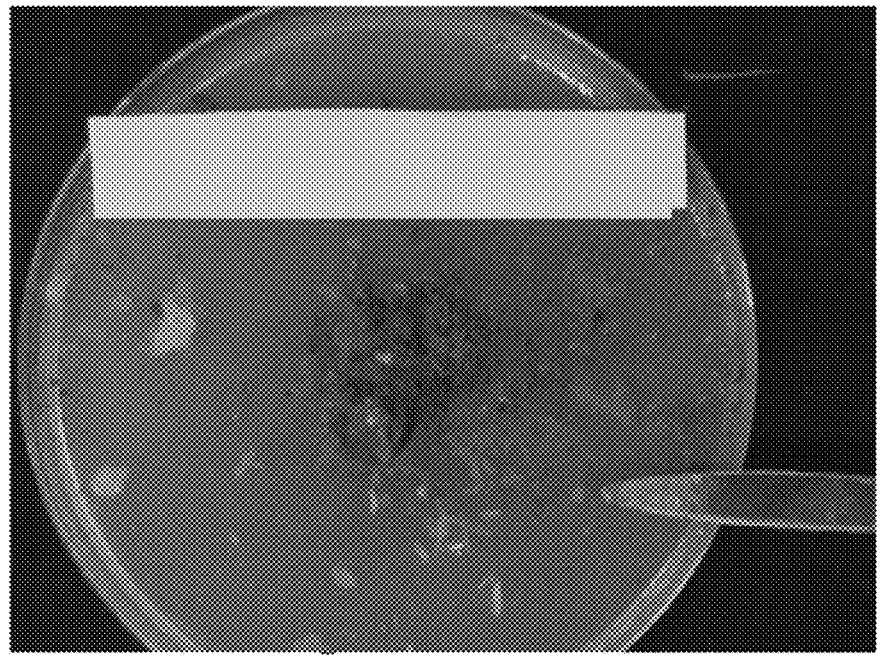
Figure 2D:
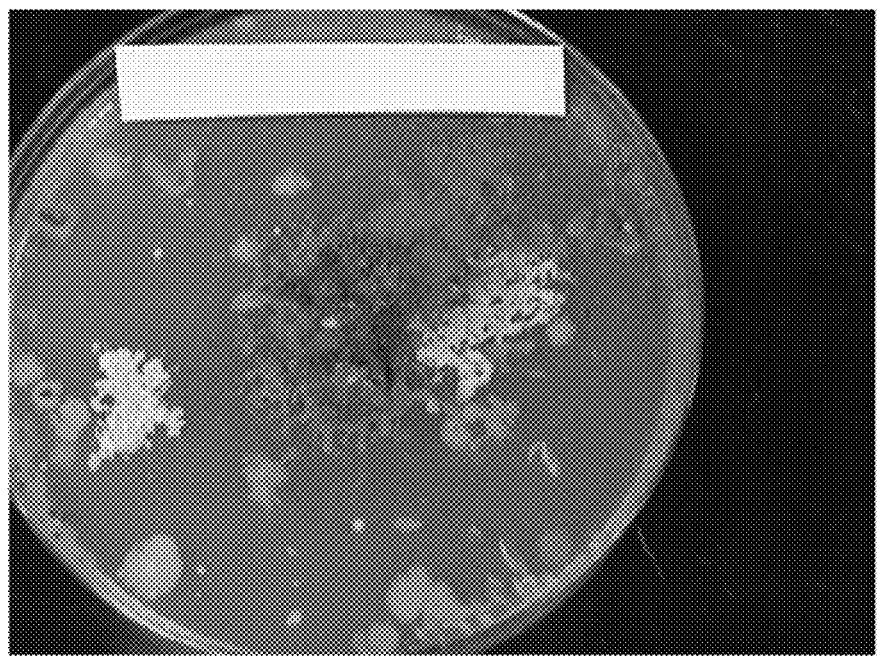
Figure 2E:
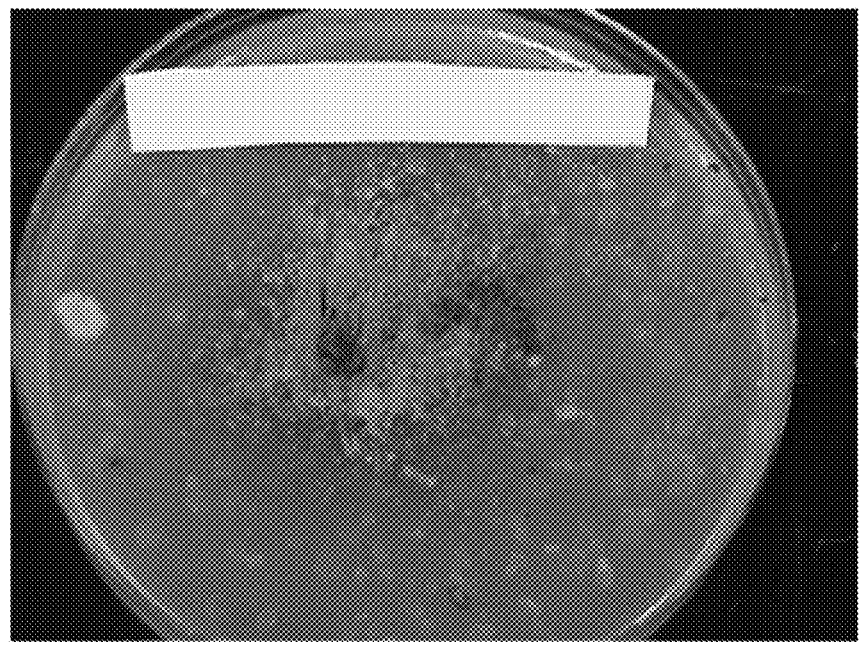
FIGS. 2E and 2F are photographs comparing bacterial growth (*Bacillis subtilis*) on agar plates in the presence of aluminum-based metallic microfoams.
Figure 2F:
Figure 2G:
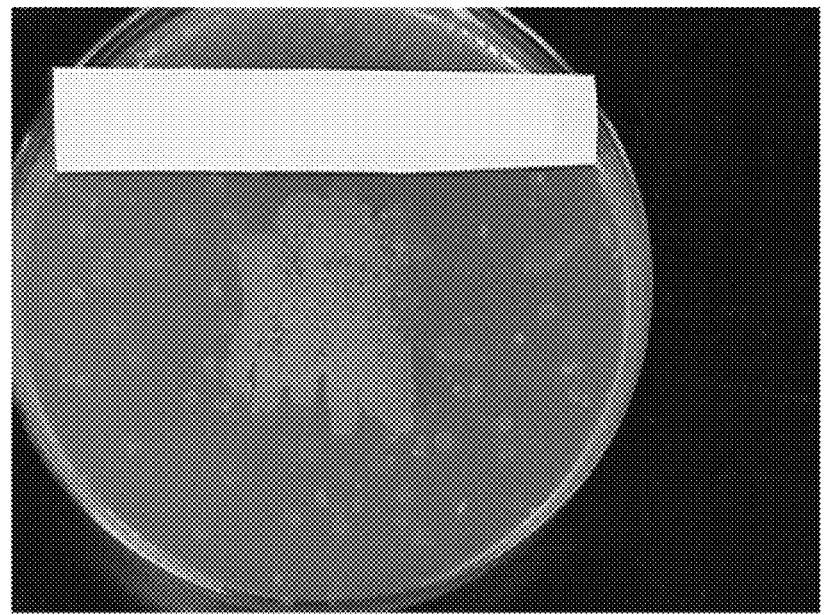
FIGS. 2G and 2H are photographs of controls comparing bacterial growth (*Bacillis subtilis*) on agar plates at 24 and 48 hours, respectively.
Figure 2H:
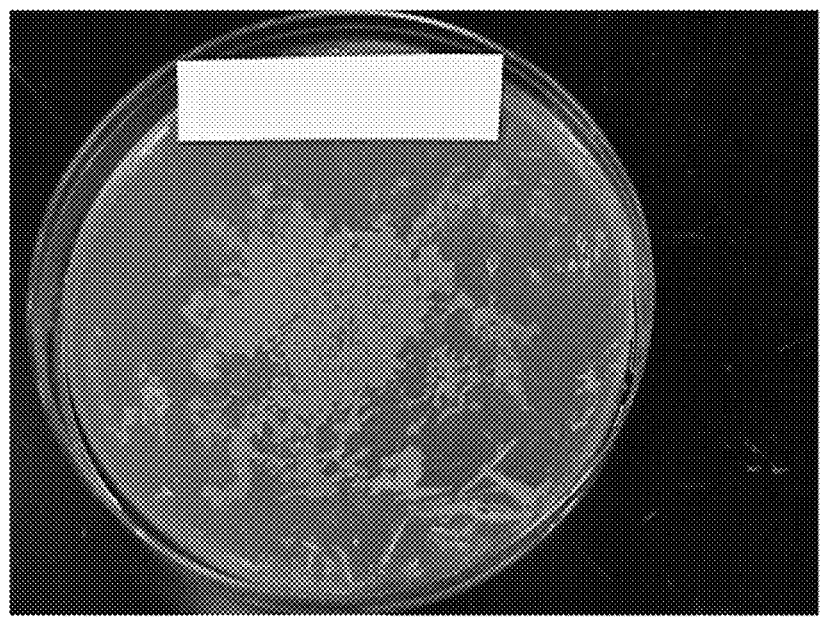

The product foams were then placed on agar plates and 50 μL of *Bacillis subtilis* was applied directly on and around the material. The metallic foams were placed in an incubator for 24 hours at 37° C. and then removed and checked for bacterial growth. The samples were then placed back into the incubator for another 24 hours and the results are shown in FIGS. 2A-2F. The bacterial growth is highlighted with a white circle. FIGS. 2G and 2H show control samples.

FIGS. 2A-2F show no bacterial growth after 24 hours on the nano $Ag_2O$ or nano $TiO_2$ materials. However, colony forming unit (CFU) growth areas are seen on the micron $Ag_2O$ nanofoam. After 48 hours, there were significant CFUs on all of the foams, except for the nano $Al+Ag_2O$, which showed no sign of any bacteria.

Figure 3:
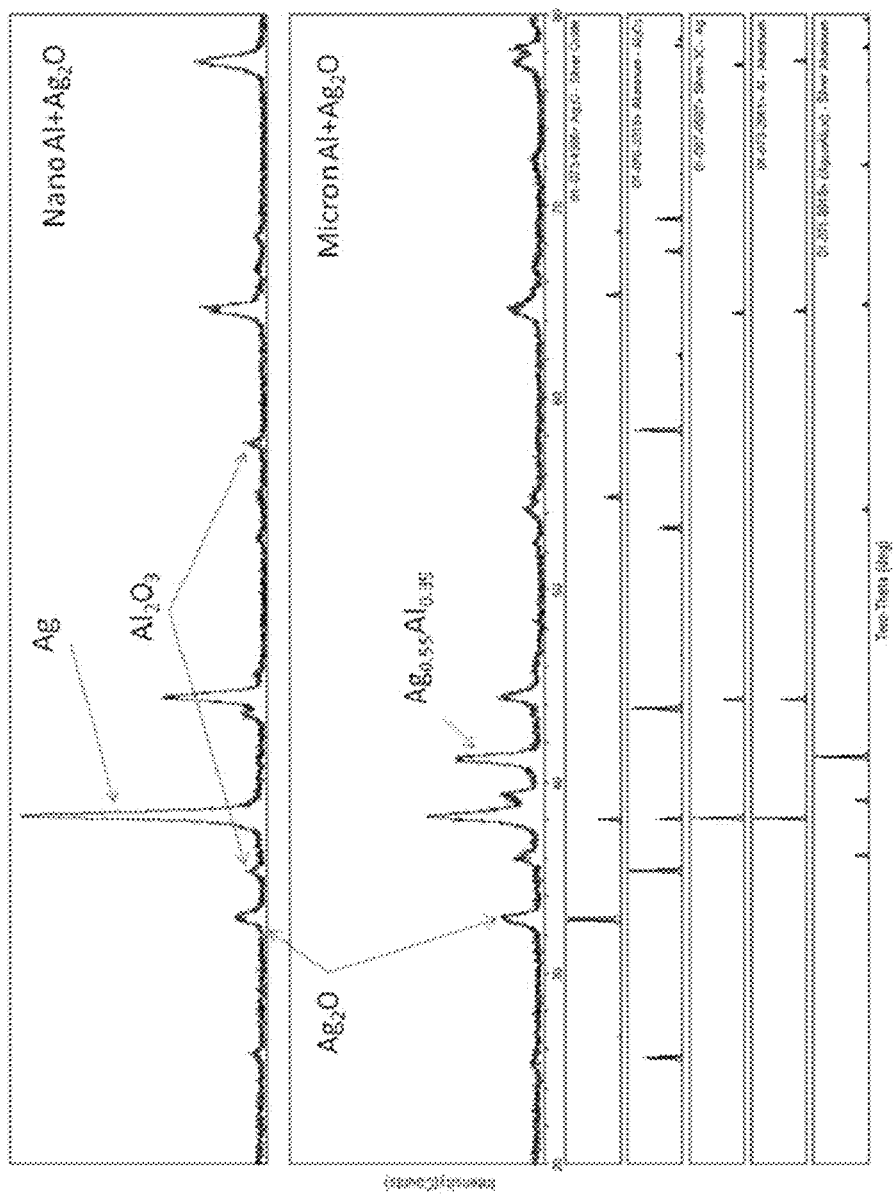
FIG. 3 compares X-ray diffraction (XRD) data of representative metallic nano- and micro-foams.
Figure 4A:
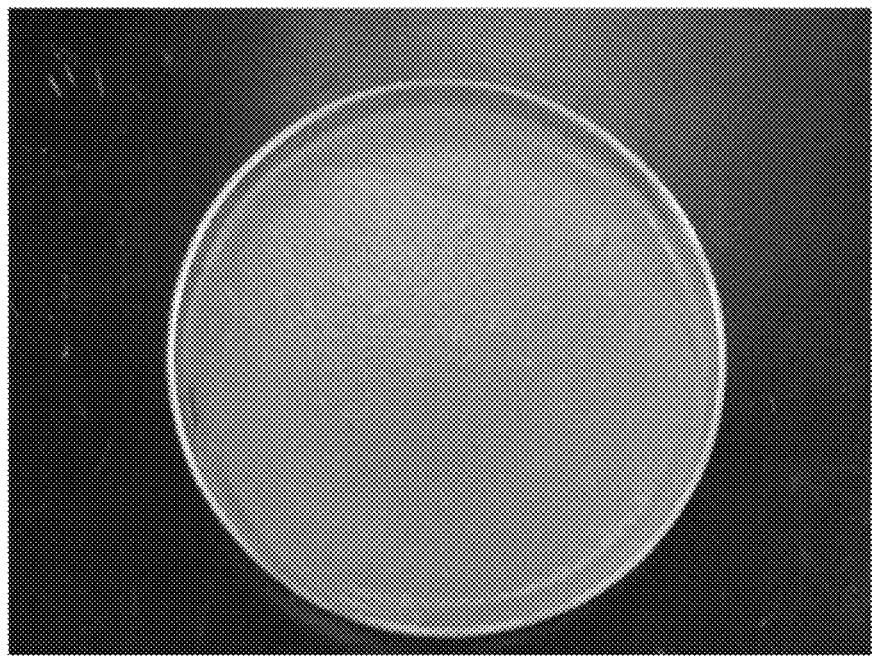
FIGS. 4A-4H are photographs comparing bacterial growth on agar plates in the presence of aluminum-based metallic nanofoams.
Figure 4B:
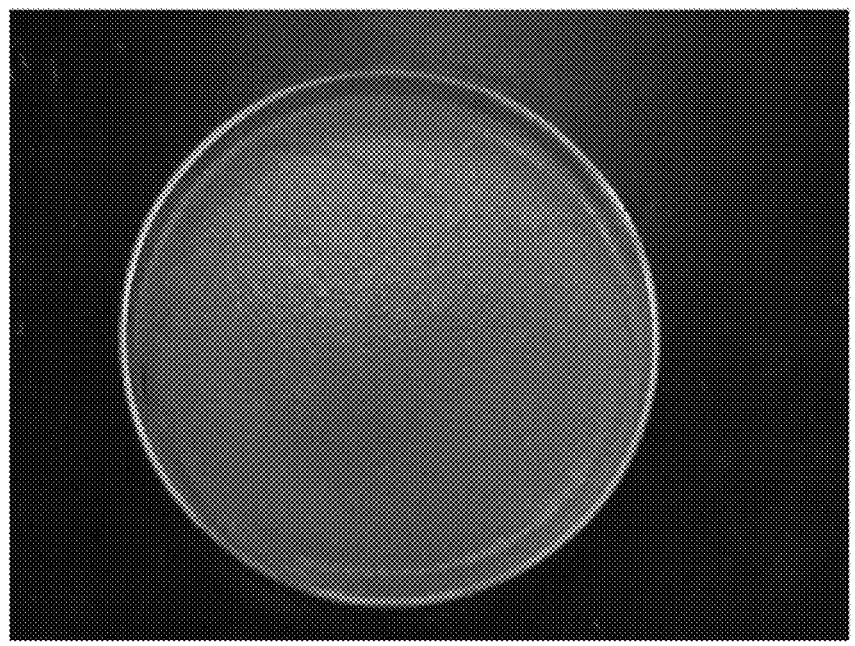
Figure 4C:
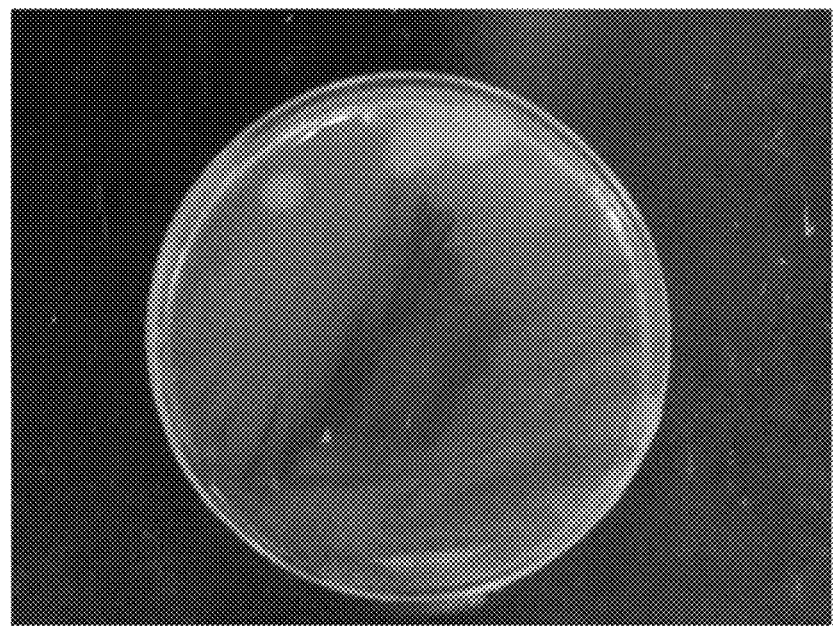
Figure 4D:
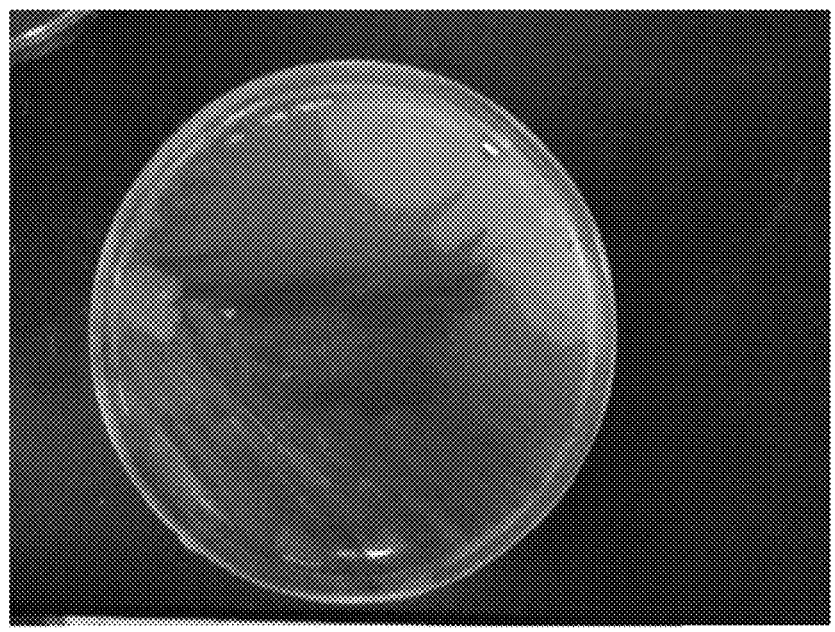
Figure 4E:
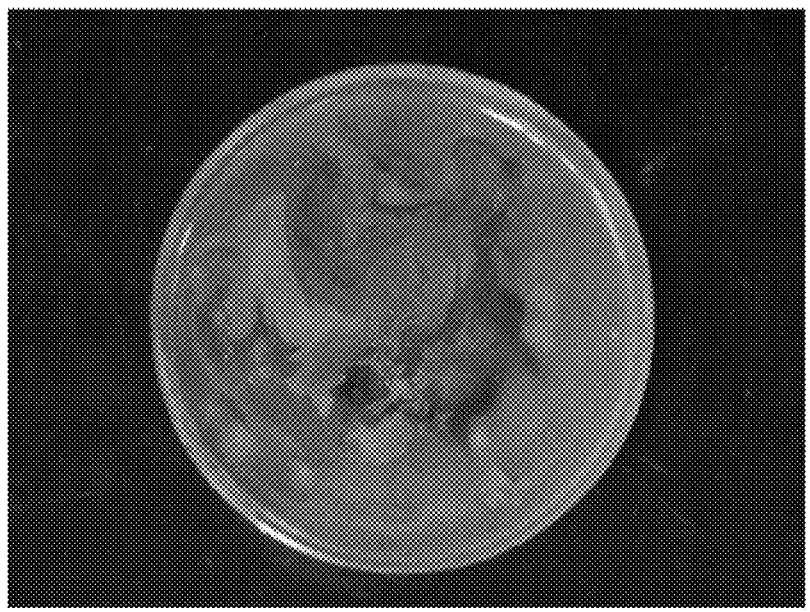
Figure 4F:
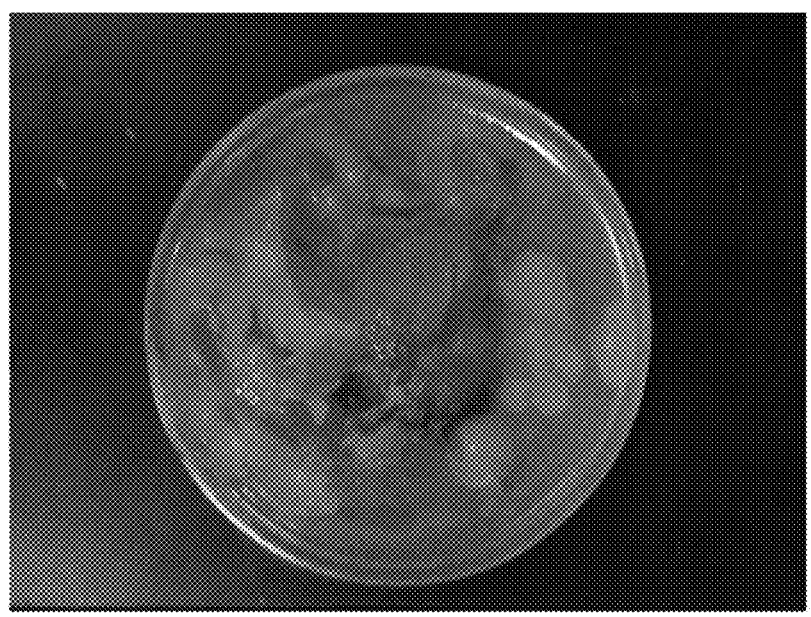
Figure 4G:
Figure 4H:

A Rigaku Ultima III X-ray diffractometer (40 kV, 44 mA, Cu Kα radiation) was employed for X-ray powder diffraction measurements (XRD) on the product materials for both particle sizes investigated. The specimens were scanned from 20.0 to 80.0 degrees in 0.15 second intervals at a resolution of 0.03 degrees and the results are shown in FIG. 3. These results give insight into the actual product composition of the metallic nanofoams. The nano $Al+Ag_2O$ show significant percentages of Ag in the products while the micron $Al+Ag_2O$ samples show high amounts of $Ag_{0.55}Al_{0.35}$.

At least five conclusions can be drawn from these results: (1) combustion synthesis can be used to create materials that have antibacterial properties; (2) bacteria growth kinetics are a function of reactant particle size; (3) nanoscale reactants are more effective in neutralizing bacteria than micron size reactants; (4) $TiO_2$ particles can delay, but not necessarily prevent bacterial growth, at least under the conditions examined in this Example; and (5) metallic nanofoams composed of nanoscale Al and $Ag_2O$ prevent growth of bacteria.

Example 2

Antibacterial Effectiveness of Representative Metallic Nanofoams

Three bacterial applications were evaluated to determine the antibacterial effectiveness of representative metallic nanofoams of the invention. The same bacteria (*Bacillus megaterium*) were used in each application. Each nanofoam tested was prepared in by the method described in Example 1.

The first method utilized a spore solution of bacteria and diluting with distilled water to provide a sample having a sufficient amount of spores. After the bacterial solution was mixed, 50 mL of the solution was extracted and placed directly on the metal nanofoam using a pipette. A variation of this technique was to place the bacterial solution over the entirety of the agar plate.

The second method utilized the diluted spore solution of bacteria described above. However, rather than using a pipette to extract 50 mL of the solution, a cotton swab was soaked with the bacterial solution and then rubbed over the entire agar plate to introduce the bacteria to the agar.

The third method was an agar overlay. First, an agar solution was heated in a test tube until liquified. Then 50 mL of the bacterial solution was placed into the agar solution and capped. The test tube was then shaken vigorously to mix the bacteria throughout the liquid agar. After mixing, the agar and bacterial solution was poured over the top of an agar plate with the nanofoam placed on it. This technique generally allows the bacteria to grow around the plate but not on or near the nanofoam in the center of the plate. Results are shown in FIGS. 4A-4H.

While illustrative embodiments have been illustrated and described, it will be appreciated that various changes can be made therein without departing from the spirit and scope of the invention.

The embodiments of the invention in which an exclusive property or privilege is claimed are defined as follows:

1. A powder comprising:
   (a) metal alloy nanoparticles, wherein the metal alloy nanoparticles comprise a metal selected from the group consisting of aluminum, titanium, manganese, molybdenum, and gold; and
   (b) metal oxide particles, wherein the metal of the metal oxide is selected from the group consisting of silver, copper, iron, tin, lead, zinc, nickel, cadmium, chromium, cobalt, bismuth, mercury, titanium, and gold, and combinations thereof, wherein the metal of the metal oxide is antibacterial, and wherein the average maximum dimension of the metal oxide particles is less than one micrometer.

2. The powder of claim 1, wherein the stoichiometric equivalence ratio of metal alloy to metal oxide is from 0.8 to 1.2.

3. A substrate having a surface, wherein at least a portion of the surface has a coating comprising the powder of claim 1.

4. The substrate of claim 3, wherein the substrate is a medical device.

5. The substrate of claim 3, wherein the surface is a surface of food processing and packaging equipment, a food preparation surface, a countertop, a cutting board, or a food serving surface.

6. The powder of claim 1, wherein the metal alloy nanoparticles comprise aluminum.

7. The powder of claim 1, wherein the metal of the metal oxide is selected from the group consisting of silver, titanium, and nickel, and combinations thereof.

8. The powder of claim 1, wherein the metal oxide is silver oxide.

9. The powder of claim 1, wherein the metal oxide is titanium oxide.

10. The powder of claim 1, wherein the metal alloy comprises aluminum and the metal oxide is silver oxide.

11. The powder of claim 1, wherein the metal alloy comprises aluminum and the metal oxide is titanium oxide.

12. A method for inhibiting bacterial growth on or in a substance, comprising contacting the substance with a powder of claim 1.

13. The method of claim 12, wherein the powder is a coating on all or part of a substrate surface.

14. The method of claim 12, wherein the bacteria growth comprises bacteria that is a spore-forming bacteria.

15. A powder comprising:
   (a) metal nanoparticles, wherein the metal of the metal nanoparticles is selected from the group consisting of aluminum, manganese, molybdenum, and gold; and (b) metal oxide particles, wherein the metal of the metal oxide is selected from the group consisting of silver, copper, iron, tin, lead, zinc, nickel, cadmium, chromium, cobalt, bismuth, mercury, titanium, and gold, and combinations thereof, wherein the metal of the metal oxide is antibacterial, and wherein the average maximum dimension of the metal oxide particles is less than one micrometer.

16. The powder of claim 15, wherein the stoichiometric equivalence ratio of metal to metal oxide is from 0.8 to 1.2.

17. The powder of claim 15, wherein the metal of the nanoparticles is aluminum.

18. The powder of claim 15, wherein the metal oxide is silver oxide.

19. The powder of claim 15, wherein the metal oxide is titanium oxide.

20. The powder of claim 15, wherein the metal of the nanoparticles is aluminum and the metal oxide is silver oxide.

21. The powder of claim 15, wherein the metal of the nanoparticles is aluminum and the metal oxide is titanium oxide.

22. A substrate having a surface, wherein at least a portion of the surface has a coating comprising the powder of claim 15.

23. The substrate of claim 22, wherein the substrate is a medical device.

24. The substrate of claim 22, wherein the surface is a surface of food processing and packaging equipment, a food preparation surface, a countertop, a cutting board, or a food serving surface.

25. A method for inhibiting bacterial growth on or in a substance, comprising contacting the substance with a powder of claim 15.

26. The method of claim 25, wherein the powder is a coating on all or part of a substrate surface.

27. The method of claim 25, wherein the bacteria growth comprises bacteria that is a spore-forming bacteria.

* * * * *